United States Patent [19]

Furukawa et al.

[11] Patent Number: 4,943,387
[45] Date of Patent: Jul. 24, 1990

[54] CHIRAL SMECTIC LIQUID CRYSTAL COMPOSITION

[75] Inventors: Kenji Furukawa, Yokosukashi; Kanetsugu Terashima, Yokohamashi, both of Japan

[73] Assignees: Chisso Corporation, Osaka; Hitachi, Ltd., Tokyo, both of Japan

[21] Appl. No.: 655,624

[22] Filed: Sep. 28, 1984

[30] Foreign Application Priority Data

Oct. 5, 1983 [JP] Japan .................. 58-186312

[51] Int. Cl.$^5$ .............. C09K 19/20; C09K 19/52; C09K 19/12; G02F 1/13
[52] U.S. Cl. .............. 252/299.67; 252/299.01; 252/299.66; 350/350 R; 350/350 S
[58] Field of Search .............. 350/350 R, 350 S; 252/299.01, 299.67, 299.66

[56] References Cited

U.S. PATENT DOCUMENTS

| | | | |
|---|---|---|---|
| 4,257,911 | 3/1981 | Gray et al. | 252/299 |
| 4,264,148 | 4/1981 | Göbl-Wunsch et al. | 350/346 |
| 4,576,732 | 3/1986 | Isogai et al. | 252/299.65 |
| 4,596,667 | 6/1986 | Inukai et al. | 350/350 S |
| 4,613,209 | 9/1986 | Goodby et al. | 350/350 S |
| 4,615,586 | 10/1986 | Geary et al. | 350/350 S |

FOREIGN PATENT DOCUMENTS

| | | | |
|---|---|---|---|
| 0110299 | 6/1984 | European Pat. Off. | 252/299.67 |
| 0115693 | 8/1984 | European Pat. Off. | 252/299.67 |
| 53-044535 | 4/1978 | Japan | 252/299.67 |
| 57-14822 | 1/1982 | Japan | 350/350 R |
| 57-212418 | 12/1982 | Japan | 252/299.01 |
| 58-029877 | 2/1983 | Japan | 252/299.63 |

OTHER PUBLICATIONS

Gray & McDonnell, *Mol. Cryst. Liq. Cryst*, vol. 34, Letters, 1977, pp. 211–217.
Goodby & Leslie, *Liquid Crystals & Ordered Fluids*, vol. 4, 1984, pp. 1–32.
Gray & Goodby, *Mol. Cryst. Liq. Cryst*, vol. 37, 1976, pp. 157–188.
Aliev et al., *Chemical Abstracts*, vol. 96, 1982, 133710.
Loseva et al., *Chemical Abstracts*, vol. 93, 1980, 86116.
Arutyunyan et al., *Chemical Abstracts*, vol. 95, 1981, 104173.

*Primary Examiner*—Matthew A. Thexton
*Assistant Examiner*—Philip Tucker
*Attorney, Agent, or Firm*—Fred Philpitt

[57] ABSTRACT

A ferroelectric liquid crystal material having a long helical pitch and still having a large spontaneous electric polarization and superior response property can be provided by mixing a chiral smectic compound or compounds having a twist sense of helix right-handed with other chiral smectic compound or compounds having a twist sense of helix left-handed and also a light switching element is provided in which the above-mentioned ferroelectric chiral smectic liquid crystal composition is used.

6 Claims, 7 Drawing Sheets

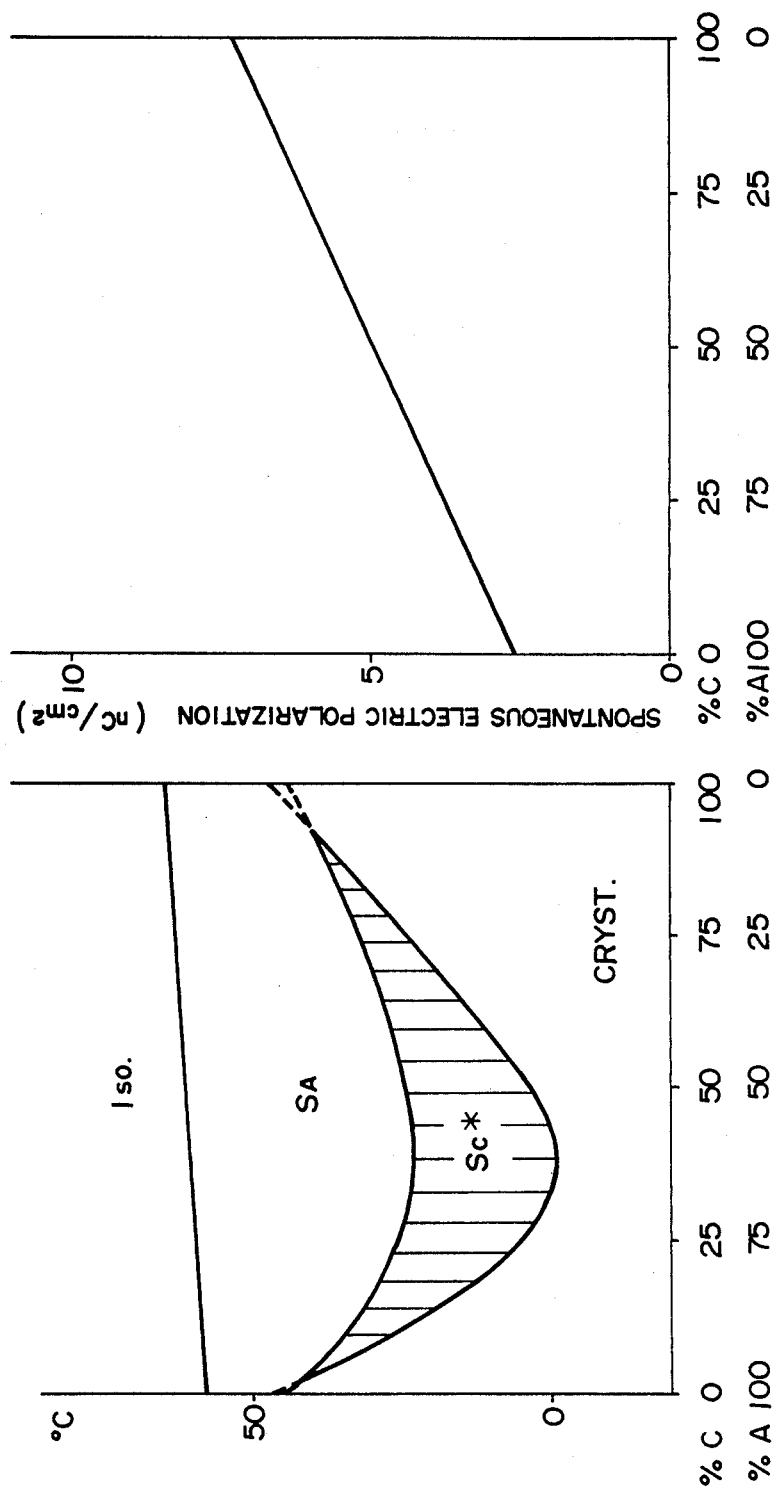

CHIRAL SMECTIC LIQUID CRYSTAL COMPOSITION

BACKGROUND OF THE INVENTION

1. Field of the Invention

This invention relates to a chiral smectic liquid crystal composition. More specifically, it relates to a ferroelectric liquid crystal material having a long helical pitch and yet having a large spontaneous electric polarization and superior response property, obtained by mixing chiral smectic compounds in which the twist sense of helix is right-handed and other chiral smectic compounds in which the twist sense of helix is left-handed, without undesirable loss of spontaneous polarization.

2. Description of the Prior Art

Liquid crystals are now being used as display materials to an increasing extent but most of such liquid crystal display elements are of Twisted Nematic (TN) display mode. Since the TN display mode is a non-emissive type, it has characteristic features that it does not give fatigue to eyes and works with extremely small power consumption. On the other hand, it has such a defect as slow response and that display is not observable depending upon the angle from which it is viewed. Recently, attempt to improve liquid crystal material has been made to meet the demand, particularly for the quick response property of display device. However, compared with other emissive displays (e.g. electroluminescense display, plasma display, etc.), there is still a great difference in response time.

To maintain the good response property comparable to emissive displays without losing the characteristic features of non-emissive type as well as its low power consumption, it is indispensable to develop a new liquid crystal display mode which can substitute for a TN type display mode. In one of such attempts, there is a display device which utilizes the light switching phenomenon of a ferroelectric liquid crystal [see N. A. Clark, S. T. Lagerwall Appl. Phys. Lett., 36,899 (1980)]. The existence of a ferroelectric liquid crystal was disclosed for the first time by R. B. Meyer et al in 1975 [see R. B. Meyer et al; J. de Physique 36, L-69 (1975)]. In terms of the usual classification of liquid crystal, this material belongs to chiral smectic C phase (abbreviated as Sc* phase) or chiral smectic H phase (abbreviated as SH* phase).

Application of light switching effect of Sc* phase to display elements has three superior characteristic feature, as compared with TN display mode. The first feature is its very fast response Its response time is less than 1/100 as compared with that of a common TN display mode. The second feature is that it has a memory effect which makes multiplexing drive easy to adopt in co-operation with the above-mentioned quick response. The third feature is the easiness of attaining the gray scale gradation of brightness. In case of a TN display mode gray scale is attained by controlling applied voltage but there are difficult problems such as temperature dependence of threshold voltage, voltage dependence of response time, etc. On the other hand, when light switching effect of Sc* phase is applied, gray scale can be attained easily by controlling polarity-inversion time. Thus the latter is very suitable for graphic display or the like.

As display methods, two methods can be considered. One of them is birefringence type which uses two polarizer plates and the other is guest-host type which uses dichroic dyes. Since Sc* phase are associated with spontaneous electric polarization a molecule turns over by a $\pi$ rotation around a helical axis which is an axis of rotation by inverting the polarity of applied voltage. By filling a liquid crystal composition having Sc* phase into a liquid crystal display cell that has been subjected to a surface treatment for aligning liquid crystal molecules parallel to electrode surface, and placing the liquid crystal cell between two polarizers arranged in advance so that the polarization plane of one of the polarizers is parallel to the director of liquid crystal molecules and inverting the polarity of applied voltage, the bright range of vision and dark range of vision (which are determined by the angle between the polarization planes) can be inter-exchanged. On the other hand, when operated by guest-host mode, colored range of vision and colorless range of vision (which are determined by the arrangement of polarization plates) can be inter-exchanged by inverting the polarity of applied voltage.

It is considered necessary that Sc* phase having spontaneous electric polarization can take bistable states on the electrode surfaces during the inversion of polarity of applied voltage. To obtain liquid crystal display elements having such bistable states and quick response property, it is necessary to make cell gap d not greater than helical pitch P (d≦P) and to unwind the helix as proposed by Clark et al [see N. A. Clark, S. T. Lagerwall Appl. Phys. Lett., 36,899 (1980)].

In general, ferroelectric liquid crystal compounds available now have mostly short helical pitches (about 0.5~2 $\mu$m) and are not suitable for practical use. Namely, it is necessary to make cell gaps in the range of about 1~2 $\mu$m to unwind the helix of Sc* phase. With the present cell manufacturing techniques, this presents difficult problems in cost and yield of display. Since the cell gap presently used in TN display mode, is on the order of 7~10 $\mu$m, it is desired to set helical pitch to 10 $\mu$m or greater in order to make ferroelectric liquid crystal displays practicable.

In the attainment of the above-mentioned bistable states of a display element which uses ferroelectric liquid crystal there is, in general, a relation of $$E_c = \frac{\pi^4 K}{4P \cdot P_s} \tag{1}$$

wherein $E_c$ is a threshold voltage necessary to invert molecules, P is a helical pitch, $P_s$ is a spontaneous electric polarization and K is a torsional elastic constant at the time of deformation due to turning-over of molecule [see B. Meyer; Mol. Cryst. & Liq. Cryst., 40,33 (1977)]. As evident from the equation (1), to make a threshold voltage smaller, it is necessary that a helical pitch be longer and spontaneous electric polarization be larger. However, in the present, there is no ferroelectric liquid crystal compound which has a long helical pitch and a large spontaneous electric polarization. Almost all of the known ferroelectric liquid crystal compounds have a short helical pitch. Accordingly several kinds of ferroelectric liquid crystal compound must be mixed to make a ferroelectric liquid crystal composition having a long helical pitch and a large spontaneous electric polarization.

It is known that in the case of cholesteric liquid crystals, the twist sense of cholesteric helix depends upon the position of asymmetric carbon atom of a side chain in a compound. It is interpreted that this is due to the alternation of the direction of methyl group attached to an asymmetric carbon atom (C*), depending upon the position of the asymmetric carbon atom. [see: M. Tsukamoto, T. Ohtsuka, K. Morimoto, Y. Murakami; Japan. J. Appl. Phys., 14, 1307 (1975)]. Namely, in case where the position of an asymmetric carbon atom of a side chain is at the even position counting from the carbon atom of benzene ring, the twist sense of helix is right-handed and in case where it is at the odd position, the twist sense of helix is left-handed when the optical active group is chemically derived from the same (S)-2-methylbutanol. We found that an analogous relation exist in the case of twist sense of Sc* phase and position of methyl group at the optical center, which knowledge formed the background of the present invention.

3. Summary of the Invention

The object of the present invention is to provide a ferroelectric liquid crystal composition having a long helical pitch and a large spontaneous electric polarization, which can be practically used in quick response display device by using a cell having a cell gap comparable with the one presently used in TN display mode. To make the helical pitch longer, there is considered a method in which a smectic C compound (abbreviated Sc) which does not have helical structure is added to a ferroelectric liquid crystal compound and also there is considered another method in which a compound having a twist sense of helix right-handed is mixed with another compound having a twist sense of helix left-handed to fully or practically compensate the twist of helix each other.

In the accompanying drawings, FIG. 1 and FIG. 2 show the concentration dependence of spontaneous electric polarization and helical pitch when a Sc compound (B) which does not show helical structure, and is expressed by a following chemical formula

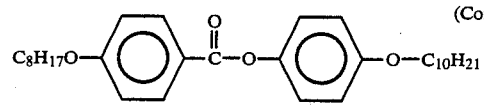
(Compound B)

is added to a compound A expressed by a following formula

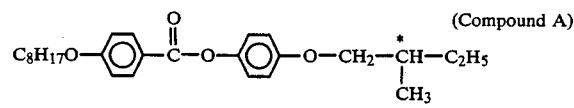
(Compound A)

As evident from the figures, spontaneous electric polarization becomes smaller as concentration of the compound B is increased and the helical pitch becomes longer. It is easily interpreted that this is due to the reduction of the concentration of the compound A which shows spontaneous electric polarization with the increase of the concentration of the compound B which does not show spontaneous electric polarization, as the result the spontaneous electric polarization as a whole is reduced. Such a method in which a Sc* compound is diluted with a Sc compound to make helical pitch longer, is not considered to be practical, as it is applicable only to the Sc* compound that shows extremely large spontaneous polarization. On the other hand according to the present invention, it is possible to easily obtain a ferroelectric liquid crystal composition having a long helical pitch and a large spontaneous electric polarization by mixing a chiral smectic liquid crystal compound or compounds having a twist sense of helix right-handed with another chiral smectic compound or compounds having a twist sense of helix left-handed. However, the two compounds of opposite twist sense mentioned above should not be the antipodes to each other, because they obviously lead to a racemate in which spontaneous polarization is cancelled out.

Namely, the first aspect of the present invention lies in (1) a ferroeleotric chiral smectic liquid crystal composition comprising, respectively, one or more kinds of chiral smectic liquid crystal compound having a twist sense of helix right-handed, and one or more chiral smectic liquid crystal compound having a twist sense of helix left-handed. Embodiments thereof are as follows. (2) A ferroelectric chiral smectic liquid crystal composition according to the above-mentioned item (1) wherein the chiral smectic liquid crystal compound having twist sense of helix right-handed and not forming a recemate, is expressed by a general formula

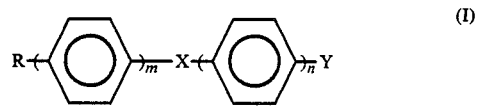
(I)

wherein m or n is an integer of 1 or 2; X is

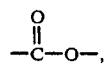

—CH=H—, —CH₂O—,

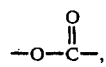

—N=CH—, —OCH₂—, or a single bond; R is an alkyl or alkoxy group of 1~18 carbon atom; Y is an alkyl, alkoxy, alkoxy carbonyl, alkanoyl or alkanoyloxy group, each having an asymmetrical carbon atom, and the other chiral smectic liquid crystal compound having a twist sense of helix left-handed is expressed by the general formula (I) and does not form a racemate. (3) A ferroelectric chiral smectic liquid crystal composition having a helical pitch of 2 μm or more, wherein a chiral smectic liquid crystal compound having a twist sense of helix right-handed is an optically active compound in which the side chain Y in the general formula (I) described in the above-mentioned item (2) is

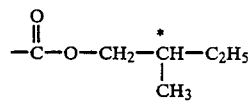

derived from (S)-2-methylbutanol and a chiral smectic liquid crystal compound having a twist sense of helix left-handed is an optically active compound in which the side chain Y of the general formula described in the formula (I) of the above-mentioned item (2) is

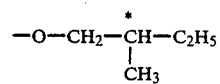

derived from (S)-2-methylbutanol.

(4) A ferroelectric chiral smectic liquid crystal composition having a helical pitch of 2 μm or greater wherein a chiral smectic liquid crystal compound having a twist sense of helix right-handed is an optically active compound in which the side chain Y of the general formula (I) described in the above-mentioned item (2) is

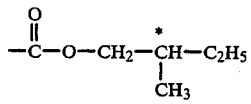

derived from (S)-2-methylbutanol and a chiral smectic liquid crystal compound having a twist sense of helix left-handed is an optically active compound in which the side chain Y in the general formula (I) described in the above-mentioned item (2) is

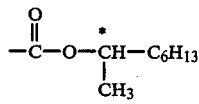

derived from (S)-1-methylheptanol (5) A ferroelectric chiral smectic liquid crystal composition having a helical pitch of 2 μm or greater wherein a chiral smectic liquid crystal compound having a twist sense of helix right-handed, is an optically active compound in which the side chain Y of the general formula (I) described in the above-mentioned item (2) is

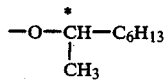

derived from (S)-1-methylheptanol and a chiral smectic liquid crystal compound having a twist sense of helix left-handed is an optically active compound in which the side chain Y of the formula (I) described in the above-mentioned item (2) is the

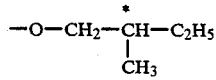

group.

The second aspect of the present invention lies in (6) a light switching element which is characterized in the use of a ferroelectric chiral smectic liquid crystal composition comprising, respectively, one or more kinds of chiral smectic liquid crystal compound having a twist sense of helix right-handed and one or more kinds of chiral smectic liquid crystal compound having a twist sense of helix left-handed.

BRIEF DESCRIPTION OF THE DRAWINGS

FIGS. 3, 4 and 5 are, respectively, a graph of phase, a graph of spontaneous electric polarization and a graph of receprocals of helical pitch of the system of two components, a compound A and a compound C.

DETAILED DESCRIPTION OF THE INVENTION

The FIG. 3 shows a phase diagram of a two component system of a compound A having a twist sense of helix left-handed and values of m=1, n=1,

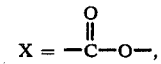

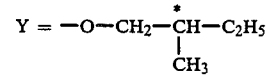

and R=C$_8$H$_{17}$O— in the above-mentioned formula (I) and a compound C having a twist sense of helix left-handed, and values of m=1, n=1, X=a single bond,

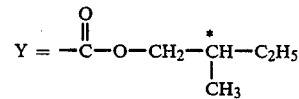

and R=C$_8$H$_{17}$O— in the formula (I)

(Compound C)

i.e. 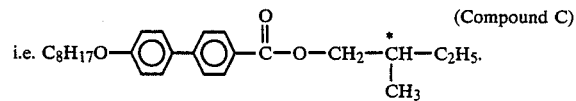

Figure 1:
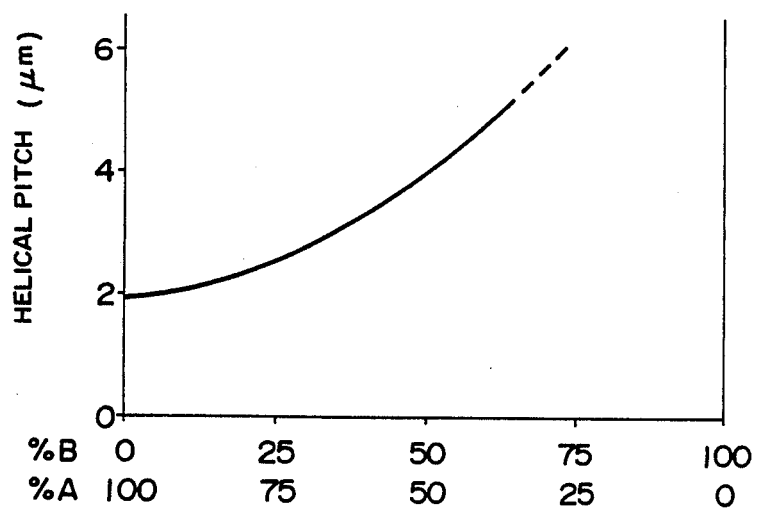
FIG. 1 and FIG. 2 are, respectively, a graph of helical pitch and a graph of spontaneous electric polarization of the system of two components, a compound A and a compound B.
Figure 2:
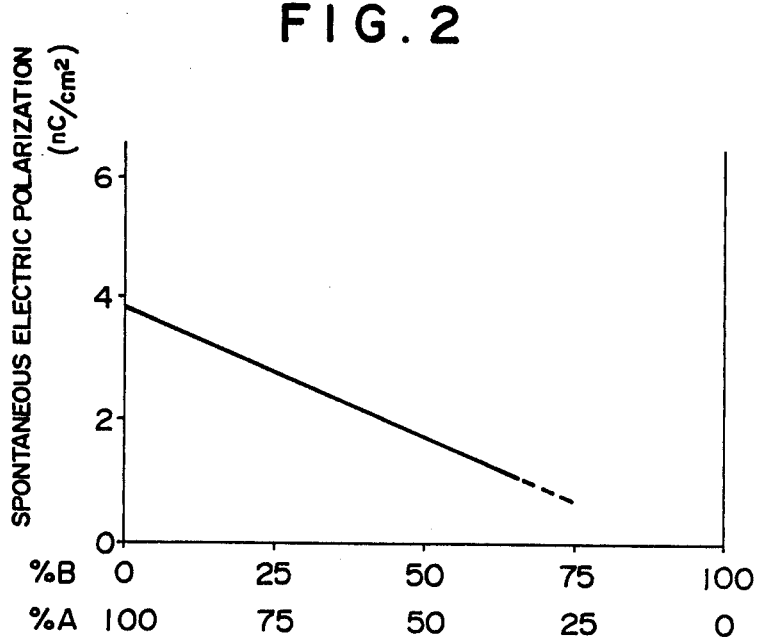
Figure 5:
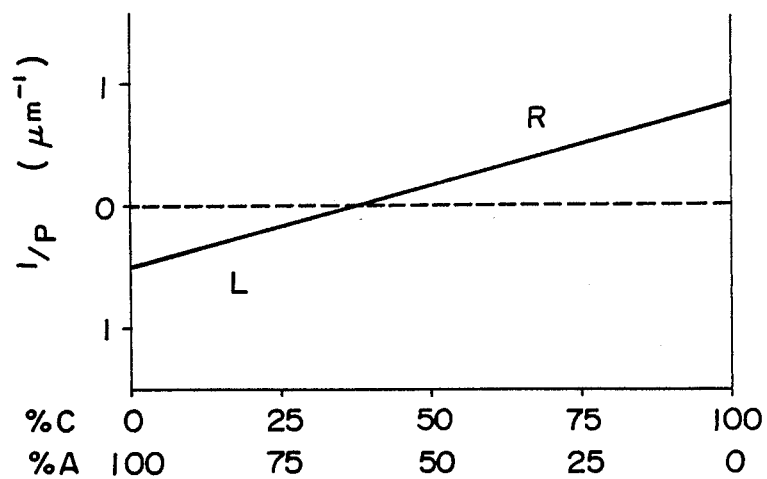

FIGS. 4 and 5 show, respectively, graphs of spontaneous electric polarization (Ps) and reciprocals (1/P) of the helical pitch of this mixed system. In these charts, Iso shows, respectively regions of an isotropic liquid phase, SA shows a smectic A phase, Sc* shows a Sc* phase and cryst. shows a crystal phase, R and L, show, respectively the regions of right-handed and left-handed twist sense of helix. Further, there is temperature dependence in spontaneous electric polarization. It becomes smaller approaching the transition temperature (Tc) of Sc*-SA. Accordingly, the spontaneous electric polarizations were measured at a temperature 5° C. lower than Tc.

As evident from the FIG. 4, additive property holds good in spontaneous electric polarization. As for this additive property of spontaneous electric polarization, a following interpretation holds.

When no voltage is applied to an electric field, a twist sense of helix is right-handed or left-handed and the dipole moment of molecules is in random direction but when a voltage is applied, the helix is unwound and since the dipole moment of molecules aligns to the direction of electric field, the molecules aligns to a definite direction. Namely, when a compound having a twist sense of helix right-handed is mixed with a compound having a twist sense of helix left-handed, the helix is unwound by the application of electric field and since the dipole moment of molecules aligns to the direction of the electric field the molecules are oriented to a definite direction, and they are turned over by a π rotation, corresponding to the inversion of the polarity of applied voltage, irrespective of twist sense of helix, i.e. whether it is right-handed or left-handed. Accordingly, the spontaneous electric polarization has no relation to whether twist sense of helix is right-handed or left-handed and it turns out to be the sum of spontaneous electric polarizations of individual components. Thus it is considered that additive property may be applied to spontaneous polarization regardless of twist sense of helix. In fact additive property holds good as shown in FIG. 4. There has been no report about this fact in the past.

Figure 6:
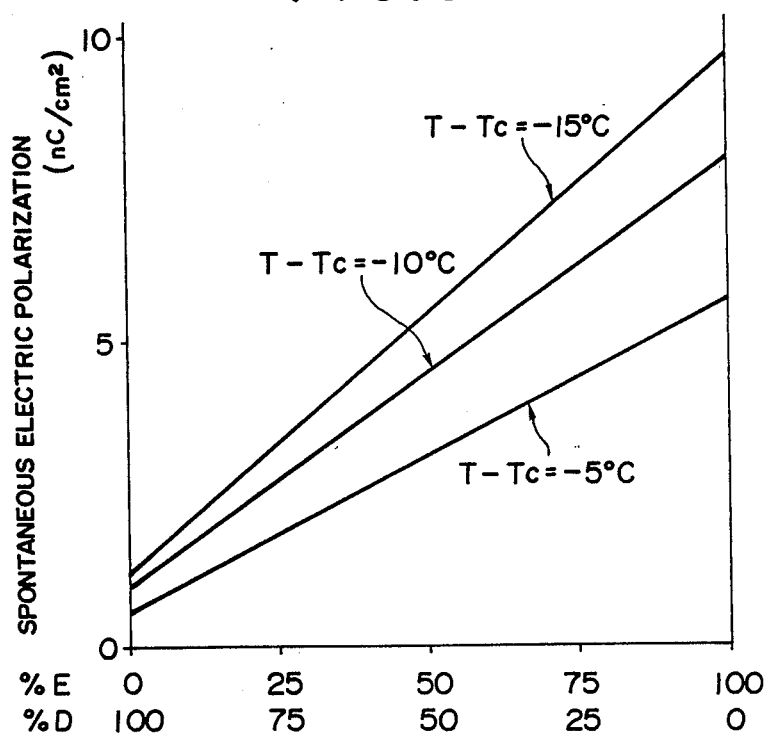
FIGS. 6, 7, 8, 9, 10, 11, 12 and 13 are graphs of spontaneous electric polarization and a receprocals of helical pitch of the system of two components: Compounds D and E in FIGS. 6 and 7; Compounds D and F in FIGS. 8 and 9; Compounds H and J in FIGS. 10 and 11, and Compounds K and L in FIGS. 12 and 13.

FIG. 6 shows spontaneous electric polarization of the two components mixed system comprising a compound D having a twist sense of helix left-handed and values of m=1, n=1,

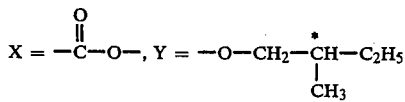

and R=C$_{12}$H$_{25}$O— in the formula (I)

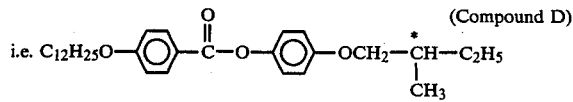
(Compound D)

and a compound E having a twist sense of helix right-handed and values of m=1, n=1, X=a single bond,

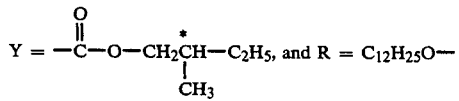

Figure 7:
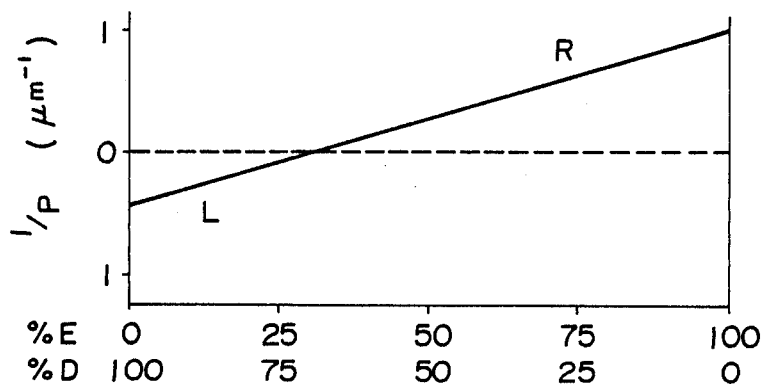

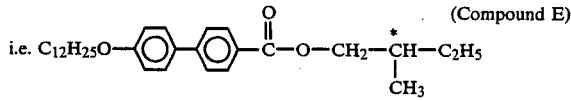
(Compound E)

at temperatures (T) lower than the transition temperature (Tc) of Sc*-SA by 5° C., 10° C. and 15° C., respectively. As in case of FIG. 4, it is shown in FIG. 6 that additive property holds in the value of spontaneous electric polarization. FIG. 7 shows the relation between the composition of the same two component system and reciprocals of helical pitches. When the amount of a compound E is about 30% by weight, helical pitch becomes infinitely large, and the spontaneous electric polarization is 2~4 nC/cm². Considering from the point of alignment, the longer the pitch, the better the aligning property. Hence the longer helical pitch of a composition would be preferable but a length of about 1 cm is long enough for practical use.

Figure 8:
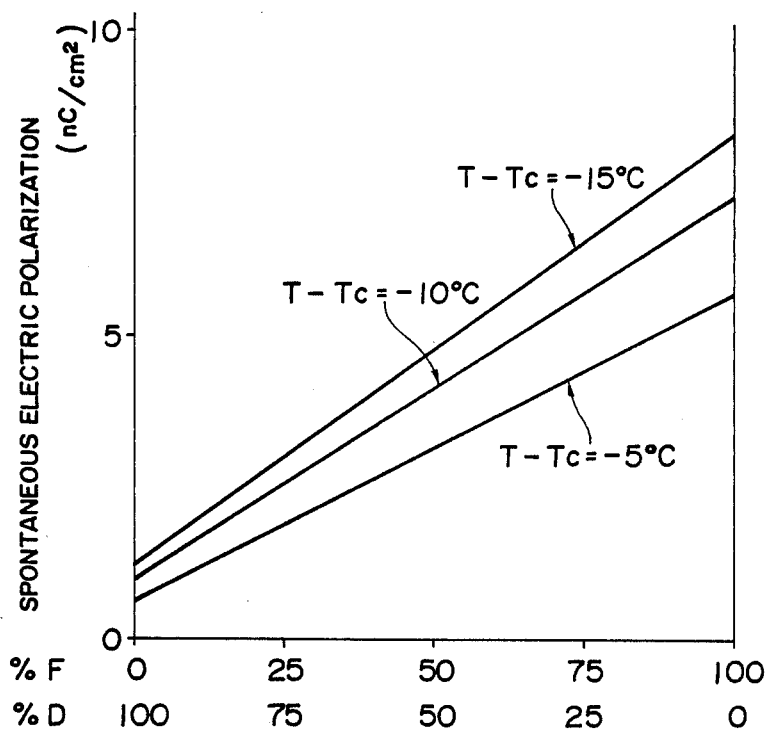
Figure 9:
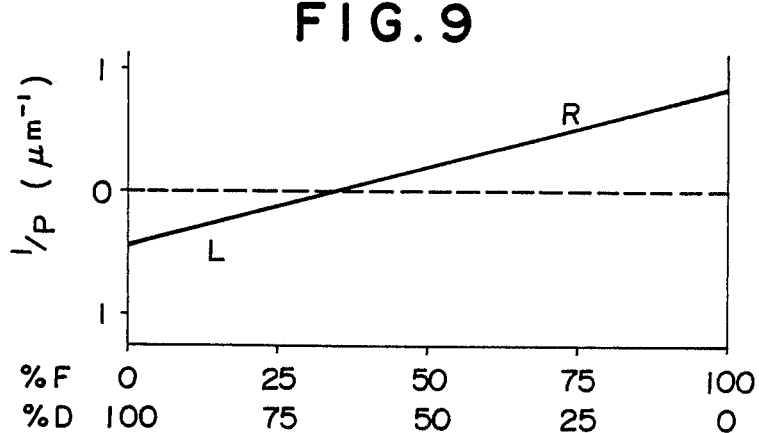

FIGS. 8 and 9 show the relation between the values of spontaneous electric polarization at temperatures lower than Sc*-SA transition temperature (Tc) of a two component mixed system by 5° C., 10° C. and 15° C., respectively vs. the composition of the two component as well as the relation between reciprocals of helicals pitch at a temperature lower than the Tc by 10° C., of the two component mixed system vs. the composition of the two component. The two component system comprises a compound D and a compound F having a twist sense of helix right-handed and values m=1, n=1,

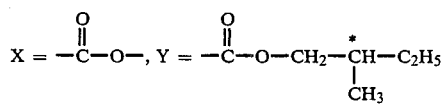

and R=C$_{10}$H$_{21}$O—
in the formula (I) i.e.

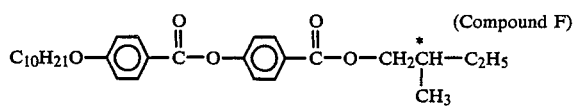
(Compound F)

As for spontaneous electric polarization, there is held additive property in FIG. 8 as in FIGS. 4 and 6. Helical pitches can be made longer by mixing and become infinitely large at a concentration of a compound F of about 30%.

Figure 10:
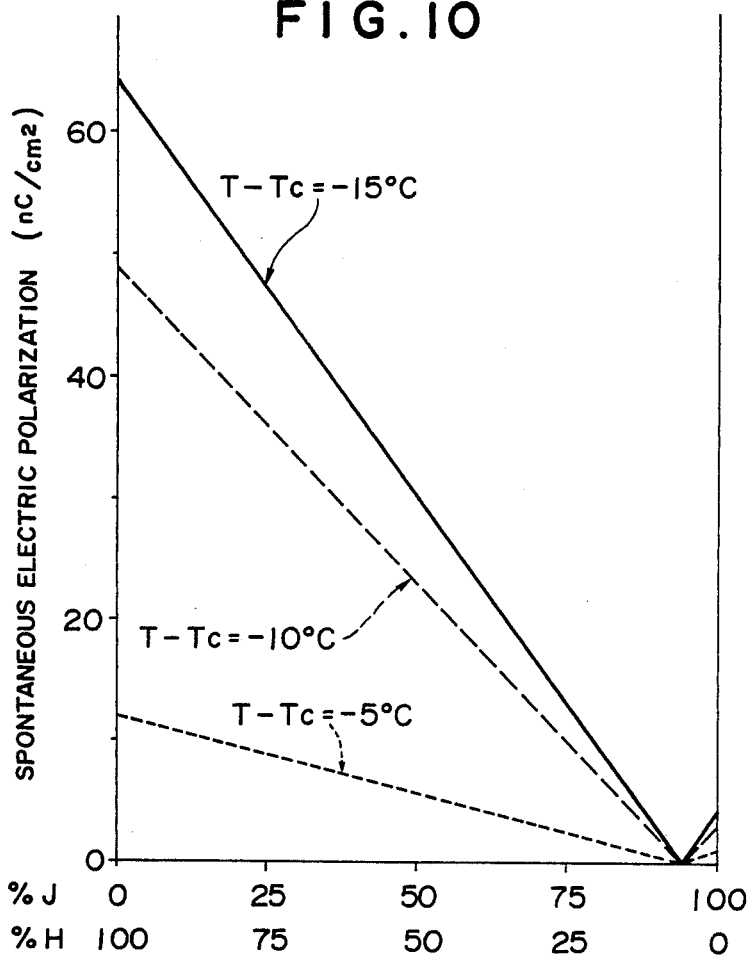
Figure 11:
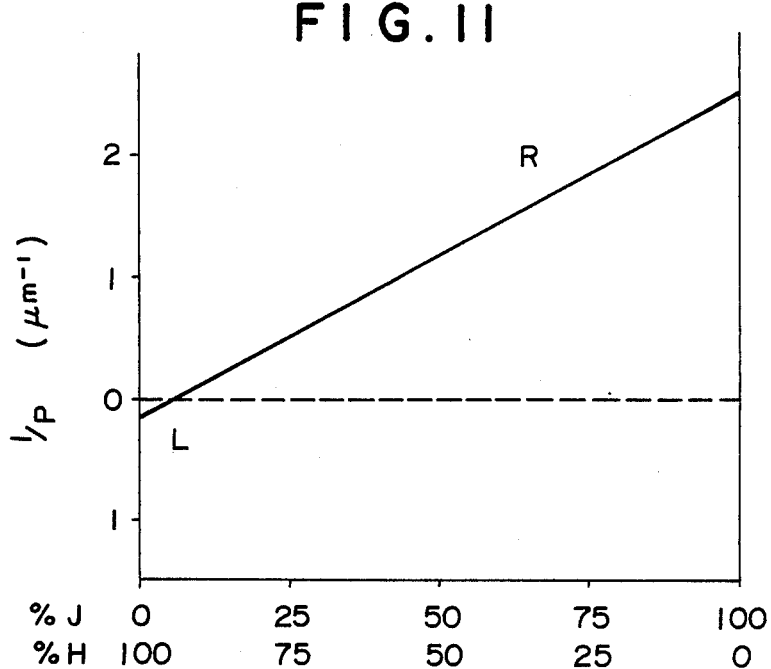

FIGS. 10 and 11 show spontaneous electric polarizations at temperatures of T-Tc of −5° C., −10° C. and −15° C. and reciprocals of helical pitch at temperature of T-Tc=−15° C. for the two component mixed system comprising a compound H having a twist sense of helix left-handed and values of

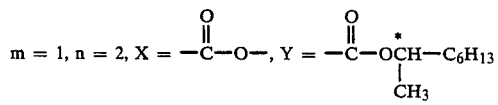

and R=C$_8$H$_{17}$O— in
the formula (I) i.e.

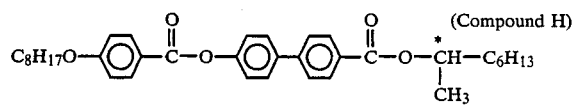
(Compound H)

and a compound J having a twist sense of helix right-handed and values of m=2, n=1,

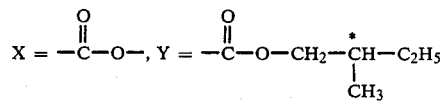

and R=C$_8$H$_{17}$O— in the formula (I) i.e.

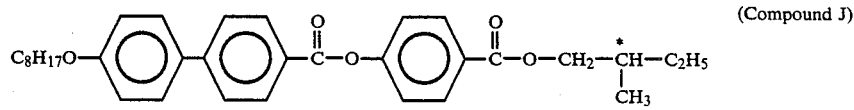
(Compound J)

Since this is a mixed system of a compound H having a short helical pitch and an extremely large spontaneous electric polarization and a compound J having a long helical pitch and a small spontaneous electric polarization, helical pitch becomes infinitely large at a concentration of compound J of about 6% by weight. The spontaneous electric polarization at this concentration is as high as 60 nC/cm² (T-Tc=−15° C.). Additive property holds good for spontaneous electric polarization also in this mixed system.

Figure 12:
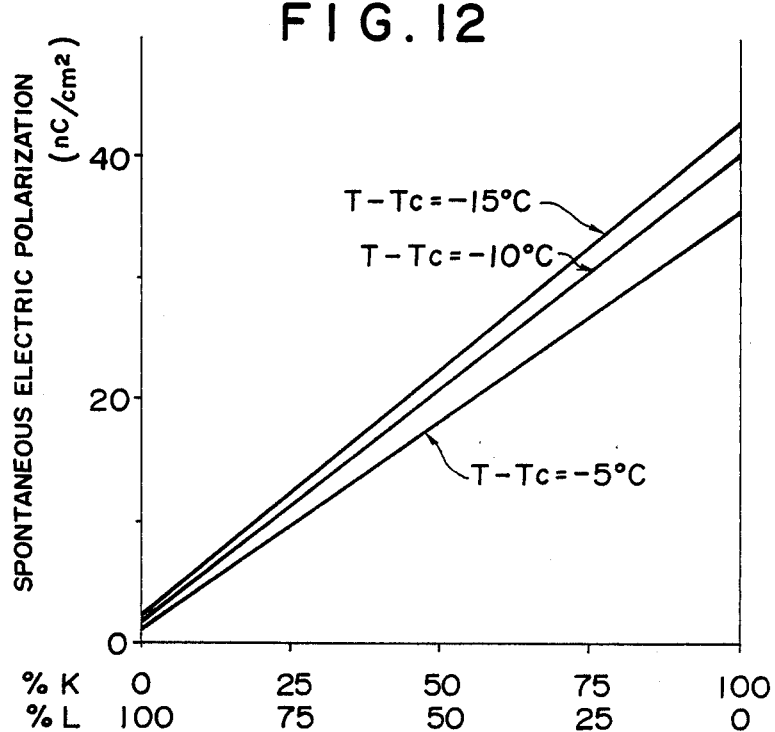
Figure 13:
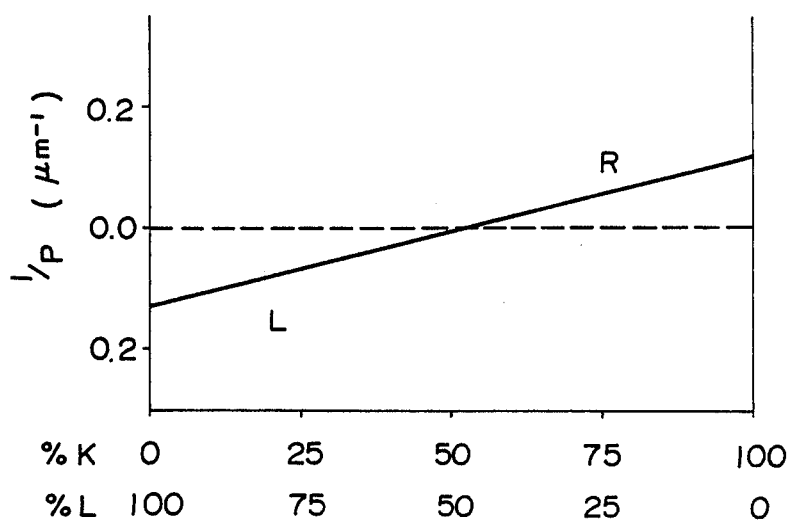

FIGS. 12 and 13 show spontaneous electric polarization (at T-Tc=−5° C., −10° C. and −15° C.) and reciprocals of helical pitch (at T-Tc=−15° C.) of the two component mixed system comprising a compound K having a twist sense of helix right-handed and values of m=1, n=2,

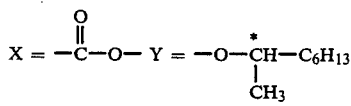

and R=C$_8$H$_{17}$O—, in the formula (I) i.e.

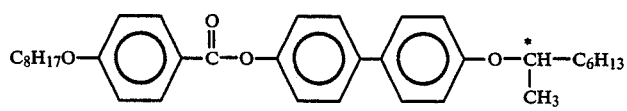

(Compound K)

and a compound L having a twist sense of helix left-handed and values of m=2, n=1,

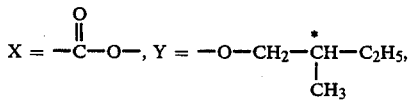

and R=C$_8$H$_{17}$O— in the formula (I) i.e.

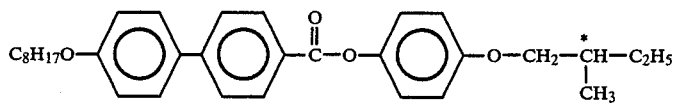

(Compound L)

Additive property holds good in spontaneous electric polarization also in this composition and helical pitch becomes infinitely large, at about 50% by weight of compound (K) and spontaneous electric polarization at this concentration becomes as great as 22 nC/cm$^2$ (at T-Tc=−15° C.).

As above-mentioned, the present invention is very practical in that a ferroelectric liquid crystal composition having a wide variation of helical pitch and large spontaneous electric polarization can be easily obtained according to the present invention.

Another effectiveness of the present invention is to provide a ferroelectric liquid crystal composition which shows Sc* phase down to extremely low temperature region.

Conventional liquid crystal compositions show lowering of melting point by mixing but in a multi-component system consisting of compounds of the formula (I) in which the side chain Y is

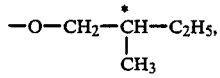

lowering of melting point is small by mixing and Sc* phase region is not widened very much. For example, a ferroelectric liquid crystal composition comprising each 20% by weight of four kinds of compounds in which

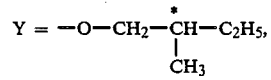

m=1, n=1, and in common but only R are different, i.e. R=C$_8$H$_{17}$O—, R=C$_9$H$_{19}$O—, R=C$_{10}$H$_{21}$O—, and R=C$_{12}$H$_{25}$O—, respectively, in the formula (I) and each 10% by weight of two kinds of compounds in which

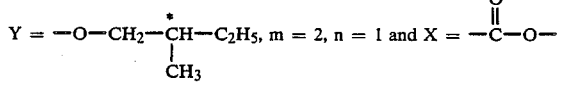

in common but only R is different, i.e. R=C$_6$H$_{13}$O— and R=C$_8$H$_{17}$O—, respectively, in the formula (I), shows Sc* phase in the range of 28° C. to 50° C., and shows SA phase in the range of 50°∼70° C. and isotropic liquid at a temperature higher than transition temperature of 70° C. Namely, in spite of mixing, any drastic reduction of melting point is not realized and it looks difficult to obtain a ferroelectric liquid crystal composition which shows Sc* phase in a wide temperature range required for practical use.

In contrast, as shown in FIG. 3, in a mixed system in which a compound of the formula (I) having a value of

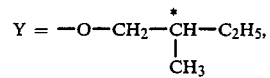

is added to a compound of the formula (I) having a value of

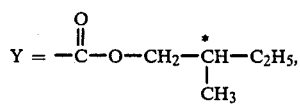

the possibility is indicated for great reduction of melting point down to as low as 0° C. to obtain ferroelectric liquid crystal compositions which show Sc* phase at lower temperature. The above-mentioned phenomenon is applicable not only to a mixture of a two component system but also to a mixture of multi-component system, as indicated in Example 2. Together with the above-mentioned helical pitch and spontaneous electric polarization, it is an important factor for the practical use, indicating the possibility of easily obtaining ferroelectric liquid crystal compositions which show a long helical pitch and a large spontaneous electric polarization and yet show Sc* phase at lower temperatures.

The present invention will be described further by way of examples but it is not offered by way of limitation. In addition, values of spontaneous electric polarizations were measured by Sawyer-Tower method and helical pitches were obtained by directly measuring, with a polarizing microscope, the distance of striped patterns corresponding to full pitch by using a cell having a base plate parallel to helical axis.

EXAMPLE 1

A mixture obtained from a compound having a twist sense of helix right-handed, i.e. compound having values of m=1, n=1, X=a single bond,

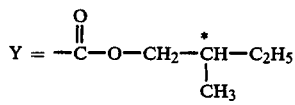

and R=$C_8H_{17}$O in the formula (I) (Compound C) in an amount of 30% by weight and as a compound having a twist sense of helix left-handed, another compound having values of m=1,

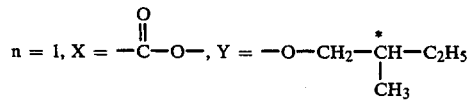

and R=$C_8H_{17}$O—
in the formula (I) (Compound A) in an amount of 70% by weight, had a helical pitch of 10 μm and a spontaneous electric polarization of 4 nC/cm$^2$. Thus a room temperature ferroelectric liquid crystal composition having a large spontaneous electric polarization in spite of its long helical pitch and yet so wide a temperature range of Sc*, phase as 0°~25° C. was obtained from this mixture.

EXAMPLE 2

A mixture obtained from compounds having a twist sense of helix right-handed, i.e. a compound having values

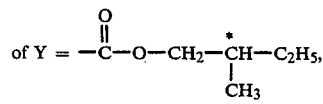

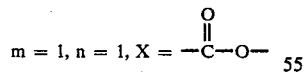

and R=$C_8H_{17}$O— in the formula (I) in an amount of 20% by weight and another compound having values of m=2, n=1,

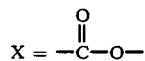

and R=$C_8H_{17}$O— in the formula (I) in an amount of 25% by weight, and compounds having a twist sense of helix left-handed, i.e. two compounds having values of

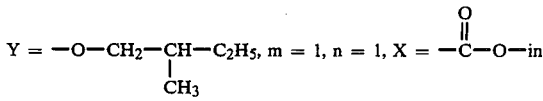

common and R=$C_8H_{17}$O—, and R=$C_9H_{19}$O—, respectively, in the formula(I) each in amounts of 20% by weight, respectively and a further compound having values of m=2, n=1,

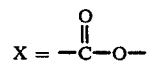

and R=$C_6H_{13}$O— in an amount of 15% by weight, had a helical pitch of 10 μm and a spontaneous electric polarization of 5.2 nC/cm$^2$. Thus a room temperature ferroelectric liquid crystal composition which has a large spontaneous electric polarization in spite of its long helical pitch and so wide a range of Sc* phase temperature region as 5°~50° C. was obtained.

EXAMPLE 3

A liquid crystal composition prepared according to the process of Example 1 was filled into a cell having been coated with an aligning agent of PVA, and subjected to parallel aligning treatment by rubbing of its surface, and having a cell gap of 10 μm and provided with transparent electrodes, and while applying a D.C. voltage of 50 V, slow cooling was carried out from isotropic liquid region until Sc* phase to obtain a uniform mono domein cell. When this liquid crystal cell is inserted between two polarizers arranged in crossed state and a low frequency A.C. of 0.5 Hz and 15 V was applied, clear switching operation was observed and thus a liquid crystal display element which shows very good contrast and a quick response of 2 milli second (m.sec.) was obtained.

EXAMPLE 4

When a composition, prepared according to the process of Example 2, made into a so-called guest-host type by adding 3% by weight of anthraquinone dye expressed by a formula of

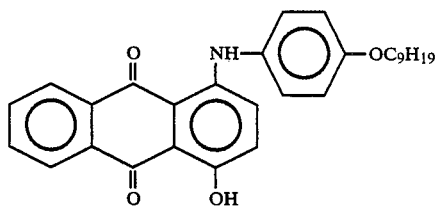

[D-16 (supplied from BDH Co.)] was filled into a cell, the same with that of Example 3, and one of the polarizer was arranged so as to make its polarization plane parallel to a molecular axis and a low frequency A.C. of 0.5 Hz and 15 V was applied, clear switching operation was observed and a colour liquid crystal display element which shows very good contrast and a quick response of 2 m.sec. was obtained.

EXAMPLE 5

A mixture obtained by using, as compounds of a twist sense of helix right-handed, 45% by weight of a compound of formula (I) wherein m=1, n=1,

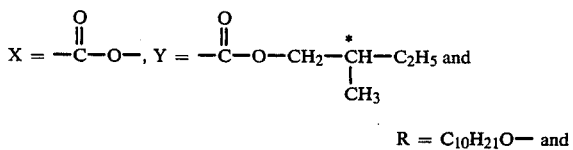

R = C$_{10}$H$_{21}$O— and

35% by weight of a compound of formula (I) wherein R=C$_{12}$H$_{25}$O— and as a compound of a twist sense of helix left-handed, 20% by weight of a compound of formula (I) wherein m=1,

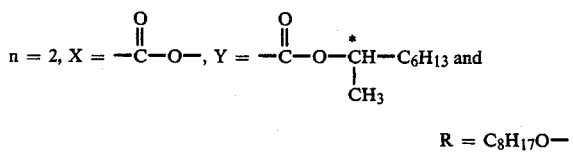

R = C$_8$H$_{17}$O— is a room temperature ferroelectric liquid crystal composition which shows Sc* phase at 13° C.~46° C., a helical pitch of 7 μm and a spontaneous electric polarization of 20 nC/cm$^2$, i.e. a composition which shows a large spontaneous electric polarization in spite of its long helical pitch.

When this composition is filled into a cell, the same with that of Example 3, which is then inserted between two polarizers arranged in crossed-Nicols state and a low frequency A.C. of 0.5 Hz and 15 V was applied, clear-cut switching operation of extremely good contrast was observed and thus a liquid crystal display element having a very quick response of 0.7 m.sec. at 20° C. was obtained.

EXAMPLE 6

A mixture obtained by using as a compound of a twist sense of helix right-handed, 25% by weight of a compound of the formula (I) wherein m=1, n=2,

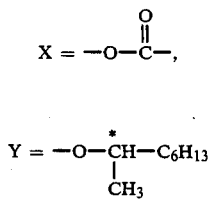

and R=C$_8$H$_{17}$O— and as compounds of a twist sense of helix left handed, 40% by weight of a compound of the formula (I) wherein

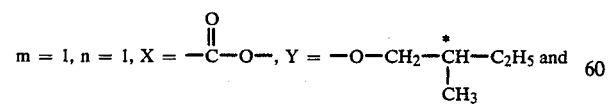

R=C$_8$H$_{17}$O— and 35% by weight of a compound of the formula (I) wherein R=C$_9$H$_{19}$O—, is a room temperature ferroelectric liquid crystal composition which shows Sc* phase at 16° C.~49° C., a helical pitch of 10 μm and a spontaneous electric polarization of 18 nC/cm$^2$, i.e. a composition which shows a large spontaneous electric polarization in spite of its long helical pitch.

This composition was made into a so-called guest-host type by adding 3% by weight of an anthraquinone dye, D-16, used in Example 4 and filled into a cell which had been constructed as in Example 3, and the arrangement was made so as to make the polarization plane of one of the polarizer parallel to a molecular axis. When a low frequency A.C. of 0.5 Hz and 15 volt was applied, clear-cut switching operation of extremely good contrast was observed and thus a color liquid crystal display element of extremely quick response of 1 m.sec. at 20° C. was obtained.

What is claimed is:

1. A ferroelectric chiral smectic liquid crystal composition comprising at least one first chiral smectic C liquid crystal compound having a twist sense of helix left handed and at least one second chiral smectic C liquid crystal compound having a twist sense of helix right-handed; said first compound being expressed by the general formula

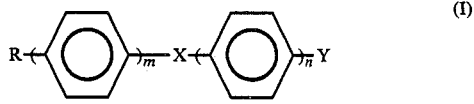

(I)

wherein R represents an alkyl or alkyloxy group of 4 to 14 carbon atoms; m and n each represent independently an integer of 1 or 2; X represents

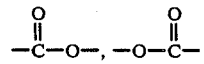

or a single bond; and Y represents

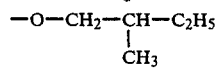

derived from (S)-2-methylbutanol or

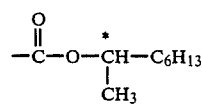

derived from (S)-1-methylheptanol, and second compound being expressed by the above-described formula (I) wherein R, m, n and X each represent independently the same as described above; but Y represents

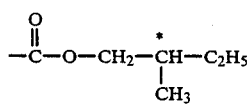

derived from (S)-2-methylbutanol or

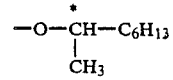

derived from (S)-1-methylheptanol.

2. A ferroelectric chiral smectic liquid crystal composition according to claim 1 and having a helical pitch of 2 μm or more, wherein said first compound having a twist sense of helix left-handed is an optically active compound in which the side chain Y of the general formula (I) is

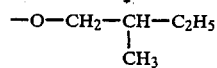

and said second compound having a twist sense of helix right-handed is an optically active compound in which the side chain Y of the general formula (I) is

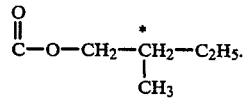

3. A ferroelectric chiral smectic liquid crystal composition according to claim I and having a helical pitch of 2 μm or more, wherein said first compound having a twist sense of helix left-handed is an optically active compound in which the side chain Y of the general formula (I) of claim 1 is

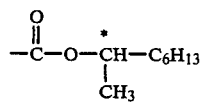

and said second compound having a twist sense of helix right-handed is an optically active compound in which the side chain Y of the general formula is

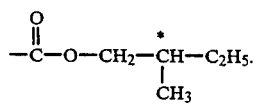

4. A ferroelectric chiral smectic liquid crystal composition according to claim 1 and having a helical pitch of 2 μm or more, wherein said first compound having a twist sense of helix left-handed is an optically active compound in which the side chain Y of the general formula (I) of claim 7 is

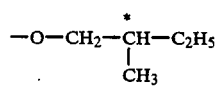

and said second compound having a twist sense of helix right-handed is an optically active compound in which the side chain Y of the general formula (I) of claim 7 is

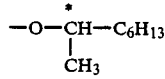

5. A light switching element characterized by employing a ferroelectric chiral smectic C liquid crystal composition comprising at least one first chiral smectic C compound having a twist sense of helix left-handed and at least one second chiral smectic C compound having a twist sense of helix right-handed, in which said first compound being expressed by the general formula

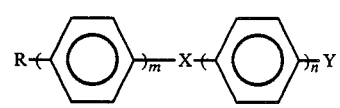

wherein R represents an alkyl or alkoxy group of 4 to 14 carbon atoms; m and n each represent independently an integar of 1 or 2; X represents

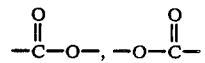

or a single bond; and Y represents

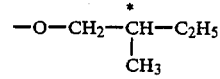

derived from (S)-2-methylbutanol or

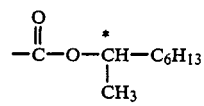

derived from (S)-1-methylheptanol, and said second compound being expressed by the above-described formula (I) wherein R, m, n and X each represent, respectively, the same as described above; but Y represents

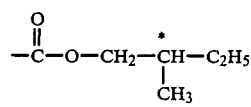

derived from (S)-2-methylbutanol or

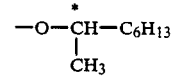

derived from (S)-1-methylheptanol.

6. A device for affecting incident electromagnetic radiation comprising a ferroelectric liquid crystal material, means for constraining said ferroelectric liquid crystal material to establish a device thickness and means for producing an electric field characterized in that said ferroelectric liquid crystals material is stable and comprises at least two components wherein at least one of said components has the opposite twist sense from a second of said components, whereby the pitch of said ferroelectric liquid crystal material is greater than 50 percent of said device thickness and wherein components are chosen so that the spontaneous polarization of said ferroelectric liquid crystal material is greater than $0.2 \times 10^{-8}$ coul/cm$^2$.